(12) United States Patent
Lu et al.

(10) Patent No.: US 9,979,304 B2
(45) Date of Patent: May 22, 2018

(54) SAMPLE-AND-HOLD CIRCUIT FOR GENERATING A VARIABLE SAMPLE SIGNAL OF A POWER CONVERTER AND METHOD THEREOF

(71) Applicant: Leadtrend Technology Corp., Hsinchu County (TW)

(72) Inventors: Hsin-Hung Lu, Hsinchu County (TW); Kuan-Hsien Chou, Hsinchu County (TW)

(73) Assignee: Leadtrend Technology Corp., Hsinchu County (TW)

( * ) Notice: Subject to any disclaimer, the term of this patent is extended or adjusted under 35 U.S.C. 154(b) by 0 days. days.

(21) Appl. No.: 15/252,241

(22) Filed: Aug. 31, 2016

(65) Prior Publication Data

US 2017/0077820 A1 Mar. 16, 2017

(30) Foreign Application Priority Data

Sep. 11, 2015 (TW) .............................. 104130042 A

(51) Int. Cl.
*H02M 3/335* (2006.01)
*H02M 1/00* (2006.01)

(52) U.S. Cl.
CPC ............... *H02M 3/33523* (2013.01); *H02M 2001/0009* (2013.01); *H02M 2001/0025* (2013.01)

(58) Field of Classification Search
CPC ..... H02M 3/33523; H02M 2001/0025; H02M 2001/0009; H02M 3/33507
See application file for complete search history.

(56) References Cited

U.S. PATENT DOCUMENTS

| 6,958,920 B2 * | 10/2005 | Mednik | H02M 3/33523 |
| | | | 323/285 |
| 7,307,390 B2 * | 12/2007 | Huynh | H02M 3/33507 |
| | | | 315/209 R |
| 7,635,956 B2 * | 12/2009 | Huynh | H02M 3/33523 |
| | | | 315/209 R |

(Continued)

FOREIGN PATENT DOCUMENTS

| TW | 200838105 | 9/2008 |
| TW | 201101666 A1 | 1/2011 |

(Continued)

*Primary Examiner* — Timothy J Dole
*Assistant Examiner* — Sisay G Tiku
(74) *Attorney, Agent, or Firm* — Winston Hsu

(57) ABSTRACT

A sample-and-hold circuit includes a first voltage generation unit, a second voltage generation unit, a stabilization capacitor. The first voltage generation unit generates a first voltage according to a first predetermined delay time and a voltage corresponding to an auxiliary winding of a power converter. The second voltage generation unit generates a second voltage according to K multiple of a discharge time of a secondary side of the power converter during a previous period of the power converter and the voltage, wherein K<1. When a sum of the K multiple of the discharge time and a second predetermined delay time leads a first valley of the voltage corresponding to a current period of the power converter, the second voltage generation unit outputs the second voltage. When the sum lags the first valley, the first voltage generation unit outputs the first voltage.

10 Claims, 10 Drawing Sheets

(56) References Cited

U.S. PATENT DOCUMENTS

| | | | |
|---|---|---|---|
| 7,646,616 B2* | 1/2010 | Wekhande | H02M 3/33507 363/20 |
| 8,536,850 B2* | 9/2013 | Wang | H02M 3/156 315/307 |
| 9,318,950 B2* | 4/2016 | Lu | H02M 1/4225 |
| 9,564,814 B2* | 2/2017 | Lu | H02M 3/33523 |
| 9,577,515 B2* | 2/2017 | Shen | H02M 1/44 |
| 2011/0292259 A1 | 12/2011 | Namba | |
| 2014/0043081 A1* | 2/2014 | Chen | H03K 5/13 327/283 |
| 2015/0311810 A1* | 10/2015 | Chen | H02M 3/33523 363/21.13 |
| 2016/0172981 A1* | 6/2016 | Gritti | H02M 3/33507 363/21.12 |

FOREIGN PATENT DOCUMENTS

| | | |
|---|---|---|
| TW | 201336213 A1 | 9/2013 |
| TW | 201340564 A | 10/2013 |

* cited by examiner

SAMPLE-AND-HOLD CIRCUIT FOR GENERATING A VARIABLE SAMPLE SIGNAL OF A POWER CONVERTER AND METHOD THEREOF

BACKGROUND OF THE INVENTION

1. Field of the Invention

The present invention relates to a sample-and-hold circuit for generating a variable sample signal of a power converter and a method thereof, and particularly to a sample-and-hold circuit and a method thereof that can generate a sample signal changed with a load coupled to a power converter.

2. Description of the Prior Art

Please refer to FIG. 1. FIG. 1 is a diagram illustrating a power converter 100 according to the prior art. A control circuit 102 of a primary side PRI of the power converter 100 is used for controlling an output voltage VOUT of the power converter 100 by detecting a voltage VFB corresponding to an auxiliary winding 104. Because a voltage of the auxiliary winding 104 is positive and negative in turn, the voltage VFB corresponding to the auxiliary winding 104 needs to be sampled at a correct time. Generally speaking, the sample-and-hold circuit 108 generates a sample signal SS to a comparator 107 of the control circuit 102 after a power switch 106 of the primary side PRI of the power converter 100 is turned off for a period of time, wherein VREF is a reference voltage. However, when a load 110 coupled to a secondary side SEC of the power converter 100 is different, a discharge time of the power converter 100 is also different, so that the sample-and-hold circuit 108 utilizes a fixed sample time to sample the voltage VFB makes a regulation effect of the control circuit 102 be poor, and the control circuit 102 further incorrectly samples the voltage VFB when the load coupled to the secondary side SEC of the power converter 100 is light.

SUMMARY OF THE INVENTION

An embodiment of the present invention provides a sample-and-hold circuit for generating a variable sample signal of a power converter. The sample-and-hold circuit includes a first voltage generator, a second voltage generator, and a comparator. The first voltage generator is used for generating a first voltage according to a first reference current. The second voltage generator is used for generating a second voltage, wherein the second voltage corresponds to a turning-on time of a power switch of the power converter. The comparator is used for generating a sample signal to a control circuit within the power converter according to the first voltage and the second voltage.

Another embodiment of the present invention provides a sample-and-hold circuit for generating a variable sample signal of a power converter. The sample-and-hold circuit includes a first voltage generator, a second voltage generator, and a stabilization capacitor. The first voltage generator is used for generating a first voltage according to a first predetermined delay time and a voltage corresponding to an auxiliary winding of the power converter. The second voltage generator is used for generating a second voltage according to K multiple of a discharge time of a secondary side of the power converter corresponding to a previous period of the power converter and the voltage corresponding to the auxiliary winding. When a sum of the K multiple of the discharge time of the secondary side and a second predetermined delay time leads a first valley of the voltage corresponding to a current period of the power converter, the second voltage generator outputs the second voltage, and the stabilization capacitor stabilizes the second voltage; and when the sum of the K multiple of the discharge time of the secondary side and the second predetermined delay time lags the first valley, the first voltage generator outputs the first voltage, and the stabilization capacitor stabilizes the first voltage, wherein K<1.

Another embodiment of the present invention provides a method for generating a variable sample signal of a power converter, wherein a sample-and-hold circuit applied to the method includes a first voltage generator, a second voltage generator, and a comparator. The method includes the first voltage generator generating a first voltage according to a first reference current; the second voltage generator generating a second voltage, wherein the second voltage corresponds to a turning-on time of a power switch of the power converter; and the comparator generating a sample signal to a control circuit within the power converter according to the first voltage and the second voltage.

Another embodiment of the present invention provides a method for generating a variable sample signal of a power converter, wherein a sample-and-hold circuit applied to the method includes a first voltage generator, a second voltage generator, and a stabilization capacitor. The method includes the first voltage generator generating a first voltage according to a first predetermined delay time and a voltage corresponding to an auxiliary winding of the power converter; the second voltage generator generating a second voltage according to K multiple of a discharge time of a secondary side of the power converter during a previous period of the power converter and the voltage corresponding to the auxiliary winding; and the second voltage generator outputting the second voltage to act as a sample signal, and the stabilization capacitor stabilizing the second voltage when a sum of the K multiple of the discharge time of the secondary side and a second predetermined delay time leads a first valley of the voltage corresponding to a current period of the power converter; and the first voltage generator outputting the first voltage to act as the sample signal, and the stabilization capacitor stabilizing the first voltage when the sum of the K multiple of the discharge time of the secondary side and the second predetermined delay time lags the first valley, wherein K<1.

The present invention provides a sample-and-hold circuit for generating a variable sample signal of a power converter and a method thereof. The sample-and-hold circuit and the method utilize a peak value of a detection voltage determined by a primary side current flowing through a power switch of the power converter and a resistor, or utilize different sample time to sample a discharge time of a secondary side of the power converter two times to generate a corresponding sample signal to a comparator of a control circuit of the power converter. Because the peak value of the detection voltage and the different sample time are changed with a load coupled to the secondary side of the power converter, a time for the sample-and-hold circuit generating the corresponding sample signal is also changed with the load coupled to the secondary side of the power converter. Therefore, compared to the prior art, the present invention can overcome a disadvantage of a fixed sample time utilized by the prior art.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
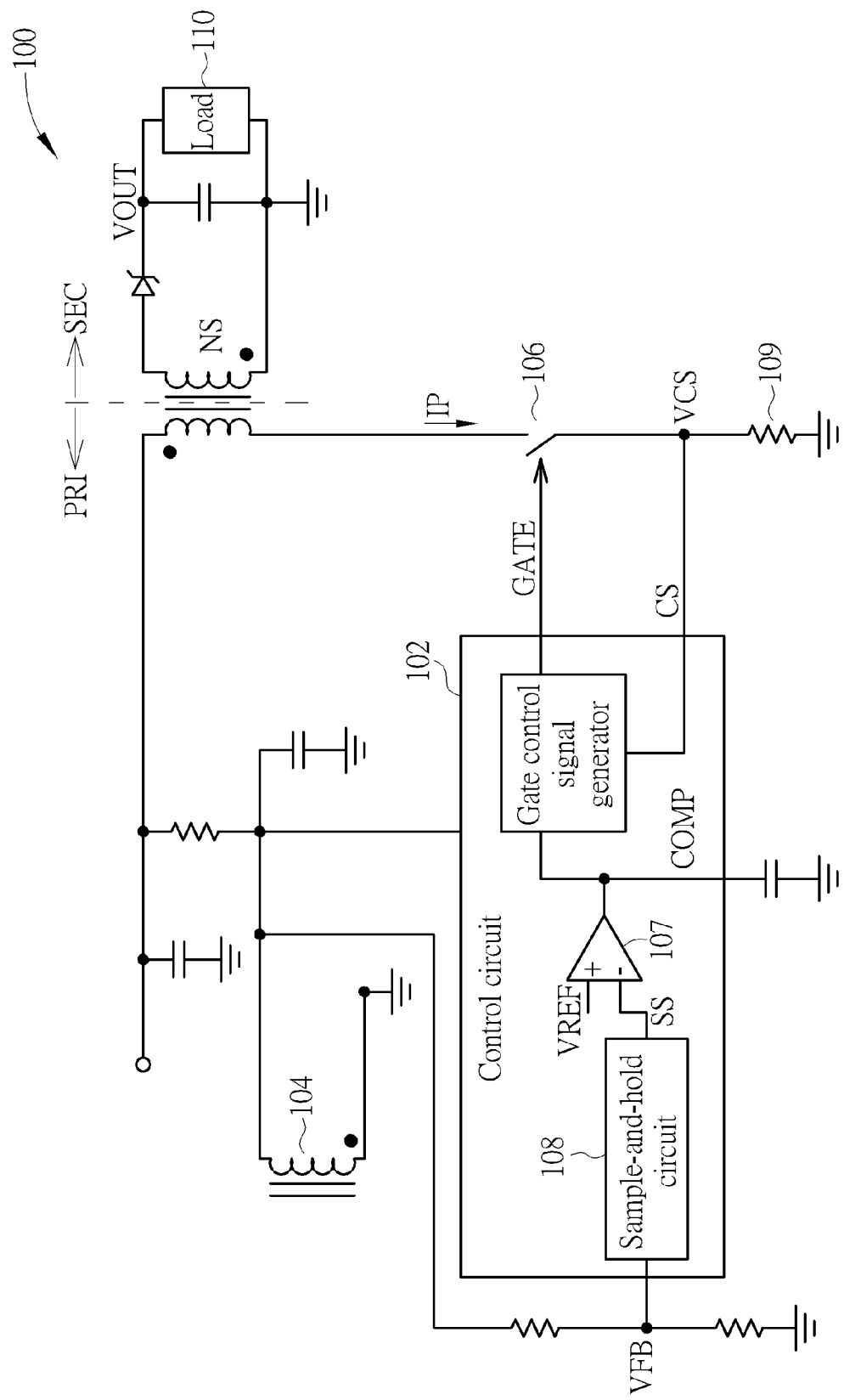
FIG. 1 is a diagram illustrating a power converter according to the prior art.
Figure 2:
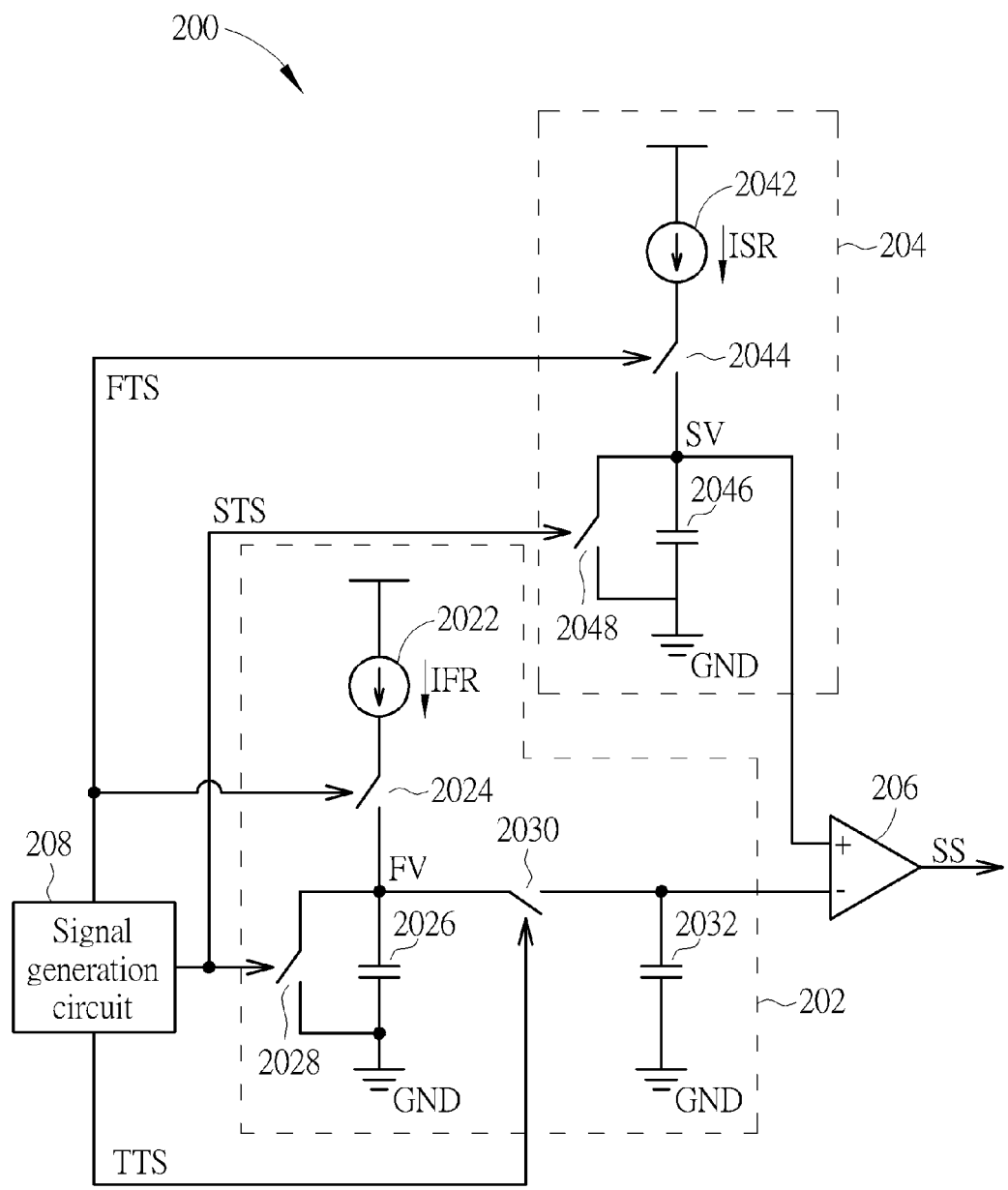
FIG. 2 is a diagram illustrating a sample-and-hold circuit for generating a variable sample signal of the power converter according to a first embodiment of the present invention.

Please refer to FIG. 2. FIG. 2 is a diagram illustrating a sample-and-hold circuit 200 for generating a variable sample signal of the power converter 100 according to a first embodiment of the present invention, wherein the sample-and-hold circuit 200 is used for replacing with the sample-and-hold circuit 108 of the control circuit 102 (shown in FIG. 1), and the power converter 100 is a flyback power converter. But, the present invention is not limited to the power converter 100 being a flyback power converter. In addition, the sample-and-hold circuit 200 is further used for receiving a detection voltage VCS determined by a primary side current IP flowing through the power switch 106 and a resistor 109. As shown in FIG. 2, the sample-and-hold circuit 200 includes a first voltage generator 202, a second voltage generator 204, and a comparator 206. The first voltage generator 202 is used for generating a first voltage FV according to a first turning-on signal FTS and a first reference current IFR, wherein an enabling time of the first turning-on signal FTS is equal to a discharge time of a current period of the power converter 100, and a discharge time of the power converter 100 is determined by the voltage VFB corresponding to the auxiliary winding 104 (shown in FIG. 1). The second voltage generator 204 is used for generating a second voltage SV according to the first turning-on signal FTS and a second reference current ISR, wherein the second reference current ISR is equal to K multiple of a difference between the first reference current IFR and a peak current, K>1, and the peak current corresponds to a peak value VCSP of the detection voltage VCS. That is to say, a relationship between the first reference current IFR and the second reference current ISR can be determined by equation (1):

$$ISR = K \times \left(IFR - \frac{VCSP}{R}\right) \quad (1)$$

As shown in equation (1), R is a resistance of the resistor 109. In one embodiment of the present invention, K is changed with the load 110 (shown in FIG. 1) coupled to the secondary side SEC of the power converter 100. That is to say, K is changed with a voltage of a pin (e.g. a COMP pin or a CS pin) of the control circuit 102, wherein the voltage of the pin (the COMP pin or the CS pin) is changed with the load 110 coupled to the secondary side SEC of the power converter 100. In addition, when the load 110 coupled to the secondary side SEC of the power converter 100 is increased, K is also increased. But, the present invention is not limited to K being changed with the load 110 coupled to the secondary side SEC of the power converter 100. That is to say, in another embodiment of the present invention, K is a predetermined proportion.

As shown in FIG. 2, the comparator 206 is used for generating the sample signal SS to the comparator 107 of the control circuit 102 of the power converter 100 according to the first voltage FV corresponding to a previous period of the power converter 100 and the second voltage SV corresponding to a current period of the power converter 100.

As shown in FIG. 2, the first voltage generator 202 includes a first current source 2022, a first switch 2024, a first capacitor 2026, a second switch 2028, a third switch 2030, and a second capacitor 2032. As shown in FIG. 2, the first current source 2022 is used for providing the first reference current IFR; the first switch 2024 is coupled to the first current source 2022 for being turning-on and turning-off according to the first turning-on signal FTS; the first capacitor 2026 is coupled between the first switch 2024 and ground GND, wherein when the first switch 2024 is turned on according to the first turning-on signal FTS, the first reference current IFR charges the first capacitor 2026 to generate the first voltage FV; the second switch 2028 is coupled between the first switch 2024 and the ground GND for being turning-on and turning-off according to a second turning-on signal STS; the third switch 2030 is coupled to the first switch 2024, the first capacitor 2026, and the second switch 2028 for being turning-on and turning-off according to a third turning-on signal TTS; and the second capacitor 2032 is coupled to the third switch 2030, the comparator 206, and the ground GND for stabilizing the first voltage FV during turning-on of the third switch 2030 according to the third turning-on signal TTS. In addition, as shown in FIG. 2, after the first switch 2024 is turned off according to the first turning-on signal FTS and before a positive edge of the turning-on time of the power switch 106 of the primary side PRI of the power converter 100, the third switch 2030 is turned on according to the third turning-on signal TTS, and after the third turning-on signal TTS and the first turning-on signal FTS are disabled, the second switch 2028 is turned on according to the second turning-on signal STS to erase residual charges stored in the first capacitor 2026.

As shown in FIG. 2, the second voltage generator 204 includes a second current source 2042, a fourth switch 2044, a third capacitor 2046, and a fifth switch 2048. The second current source 2042 is used for providing the second reference current ISR; the fourth switch 2044 is coupled to the second current source 2042 for being turning-on and turning-off according to the first turning-on signal FTS; the third capacitor 2046 is coupled between the fourth switch 2044 and the ground GND, wherein when the fourth switch 2044 is turned on according to the first turning-on signal FTS, the second reference current ISR charges the third capacitor 2046 to generate the second voltage SV, wherein a capacitance of the third capacitor 2046, a capacitance of the second capacitor 2032, and a capacitance of the first capacitor 2026 are equal; and the fifth switch 2048 is coupled to the fourth switch 2044, the comparator 206, and the ground GND for being turning-on and turning-off according to the second turning-on signal STS. In addition, after the third turning-on signal TTS and the first turning-on signal FTS are disabled, the fifth switch 2048 is turned on according to the second turning-on signal STS to erase residual charges stored in the third capacitor 2046.

In addition, the sample-and-hold circuit 200 further includes a signal generation circuit 208 for generating the first turning-on signal FTS, the second turning-on signal STS, and the third turning-on signal TTS.

Figure 3:
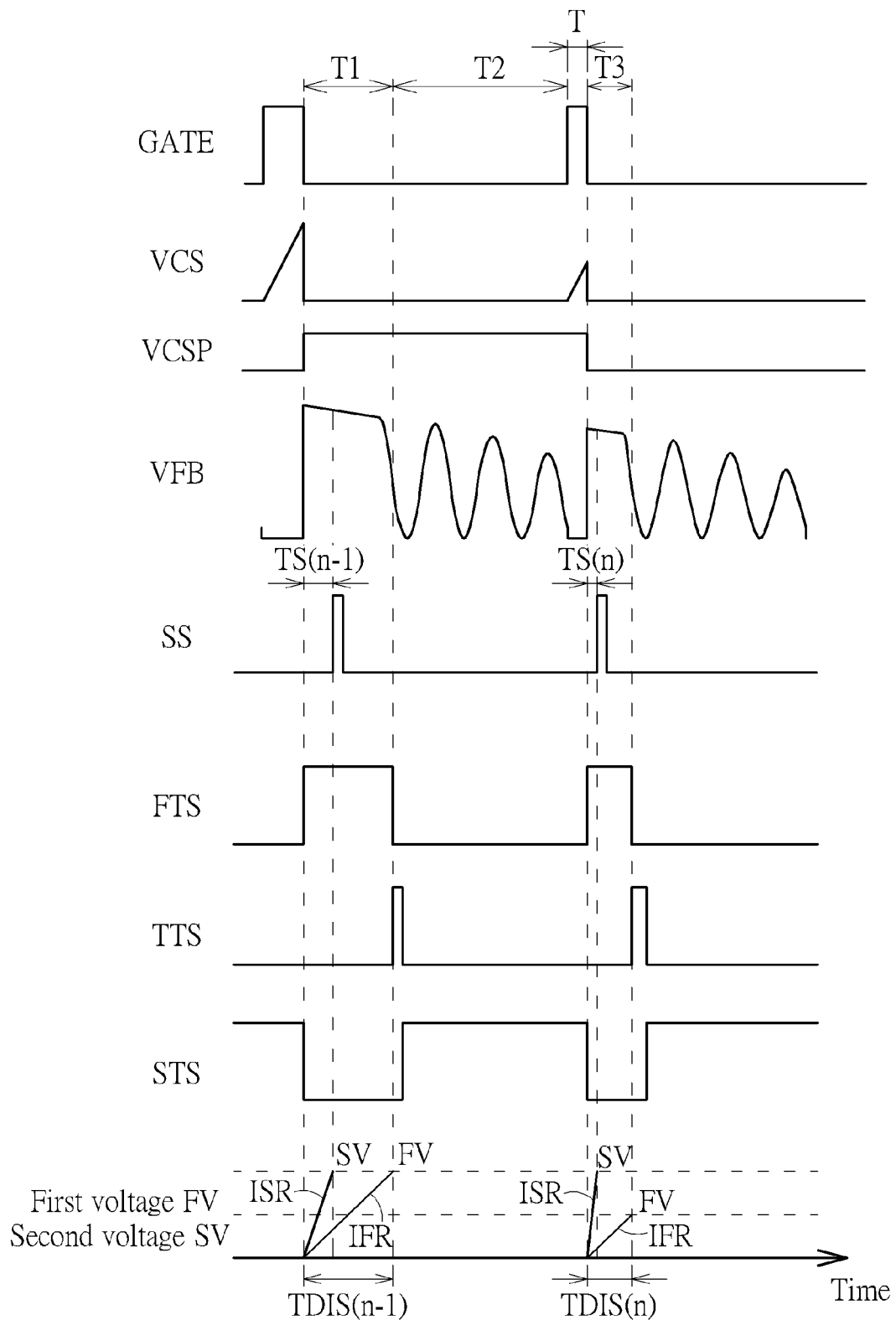
FIG. 3 is a timing diagram illustrating a gate control signal for controlling turning-on and turning-off of the power switch of the primary side of the power converter, the voltage corresponding to the auxiliary winding, the first turning-on signal, the second turning-on signal, the third turning-on signal, the sample signal, the first voltage, the second voltage, the detection voltage, and the peak value of the detection voltage.

Please refer to FIG. 3. FIG. 3 is a timing diagram illustrating agate control signal GATE for controlling turning-on and turning-off of the power switch 106 of the primary side PRI of the power converter 100, the voltage VFB corresponding to the auxiliary winding 104, the first turning-on signal FTS, the second turning-on signal STS, the third turning-on signal TTS, the sample signal SS, the first voltage FV, the second voltage SV, the detection voltage VCS, and the peak value VCSP of the detection voltage VCS. As shown in FIG. 1 and FIG. 3, during a time T1, because the gate control signal GATE is disabled, the power switch 106 is turned off and a secondary side winding NS of the power converter 100 starts to charge the load 110, resulting in the voltage VFB starting to be decreased. During the time T1, because the first turning-on signal FTS is enabled, the first switch 2024 and the fourth switch 2044 are turned on, and the first reference current IFR charges the first capacitor 2026 to generate the first voltage FV corresponding to the time T1 and the second reference current ISR charges the third capacitor 2046 to generate the second voltage SV corresponding to the time T1, wherein during the time T1, the enabling time of the first turning-on signal FTS is equal to a discharge time TDIS(n−1) of the power converter 100 corresponding to the time T1.

As shown in FIG. 3, during a time T2, the third turning-on signal TTS is enabled between a negative edge of the first turning-on signal FTS and the positive edge of the turning-on time of the power switch 106 of the primary side PRI of the power converter 100. Therefore, the second capacitor 2032 stores the first voltage FV corresponding to the time T1 during turning-on of the third switch 2030 according to the third turning-on signal TTS. In addition, as shown in FIG. 3, during the time T2, after the third turning-on signal TTS is disabled, the second switch 2028 is turned on according to the second turning-on signal STS to erase residual charges stored in the first capacitor 2026, and the fifth switch 2048 is turned on according to the second turning-on signal STS to erase residual charges stored in the third capacitor 2046. That is to say, when the time T2 is finished, potentials of the first capacitor 2026 and the third capacitor 2046 are equal to potential of the ground GND.

As shown in FIG. 3, during a time T3, because the gate control signal GATE is disabled again, the power switch 106 is turned off and the secondary side winding NS of the power converter 100 starts to charge the load 110, resulting in the voltage VFB starting to be decreased. During the time T3, the first turning-on signal FTS is enabled, so the first switch 2024 and the fourth switch 2044 are turned on, and the first reference current IFR charges the first capacitor 2026 again to generate the first voltage FV corresponding to the time T3 and the second reference current ISR charges the third capacitor 2046 again to generate the second voltage SV corresponding to the time T3. During the time T3, a voltage stored in the second capacitor 2032 is equal to the first voltage FV corresponding to the time T1, that is, a voltage inputted in a negative input terminal of the comparator 206 is equal to the first voltage FV corresponding to the time T1. Therefore, when the second voltage SV corresponding to the time T3 (a voltage inputted in a positive input terminal of the comparator 206 comparator 206) is greater than the first voltage FV corresponding to the time T1 (that is, at a time TS (n)), the comparator 206 generates the sample signal SS, wherein the time TS(n) can be determined by equation (2) and the discharge time TDIS(n−1) corresponding to the time T1:

$$TS(n) = \frac{IFR \times TDIS(n-1)}{K\left(IFR - \frac{VCSP}{R}\right)} \quad (2)$$

Therefore, as shown in FIG. 3, because the turning-on time of the power switch 106 corresponding to a time T is shorter, the peak value VCSP of the detection voltage VCS corresponding to the time T is also smaller, resulting in the second reference current ISR being increased. Therefore, as shown in equation (2) and FIG. 3, during the time T3, because the second reference current ISR is increased, the time TS(n) for the comparator 206 generating the sample signal SS is decreased. That is to say, during the time T3, the time TS(n) for the comparator 206 generating the sample signal SS is not only changed with the discharge time TDIS(n−1) corresponding to the time T1 (wherein the discharge time TDIS(n−1) corresponding to the time T1 is changed with the load 110), but also changed with the peak value VCSP of the detection voltage VCS corresponding to the time T. Because the time TS(n) for the comparator 206 generating the sample signal SS is not only changed with the load 110 corresponding to the time T1, but also changed with the peak value VCSP of the detection voltage VCS corresponding to the time T, the sample-and-hold circuit 200 can overcome a disadvantage of a fixed sample time utilized by the prior art. In addition, as shown in FIG. 3, TDIS(n) is the discharge time of the power converter 100 corresponding to the time T3 (that is, the enabling time of the first turning-on signal FTS during the time T3), and TS(n−1) is equal to time for the comparator 206 generating the sample signal SS during the time T1.

But, the present invention is not limited to potentials of the first turning-on signal FTS, the second turning-on signal STS, and the third turning-on signal TTS shown in FIG. 3. That is to say, any that the sample-and-hold circuit 200 generates a variable sample signal changed with the load 110 and the turning-on time of the gate control signal GATE according to the first turning-on signal FTS, the second turning-on signal STS, and the third turning-on signal TTS falls within the scope of the present invention. In addition, the present invention is also not limited to the first voltage FV being inputted to the negative input terminal of the comparator 206 and the second voltage SV being inputted to the positive input terminal of the comparator 206. That is to say, the first voltage FV can also be inputted to the positive input terminal of the comparator 206 and the second voltage SV can also be inputted to the negative input terminal of the comparator 206. Meanwhile, the control circuit 102 only needs to be adjusted accordingly to respond an inverse sample signal.

Figure 4:
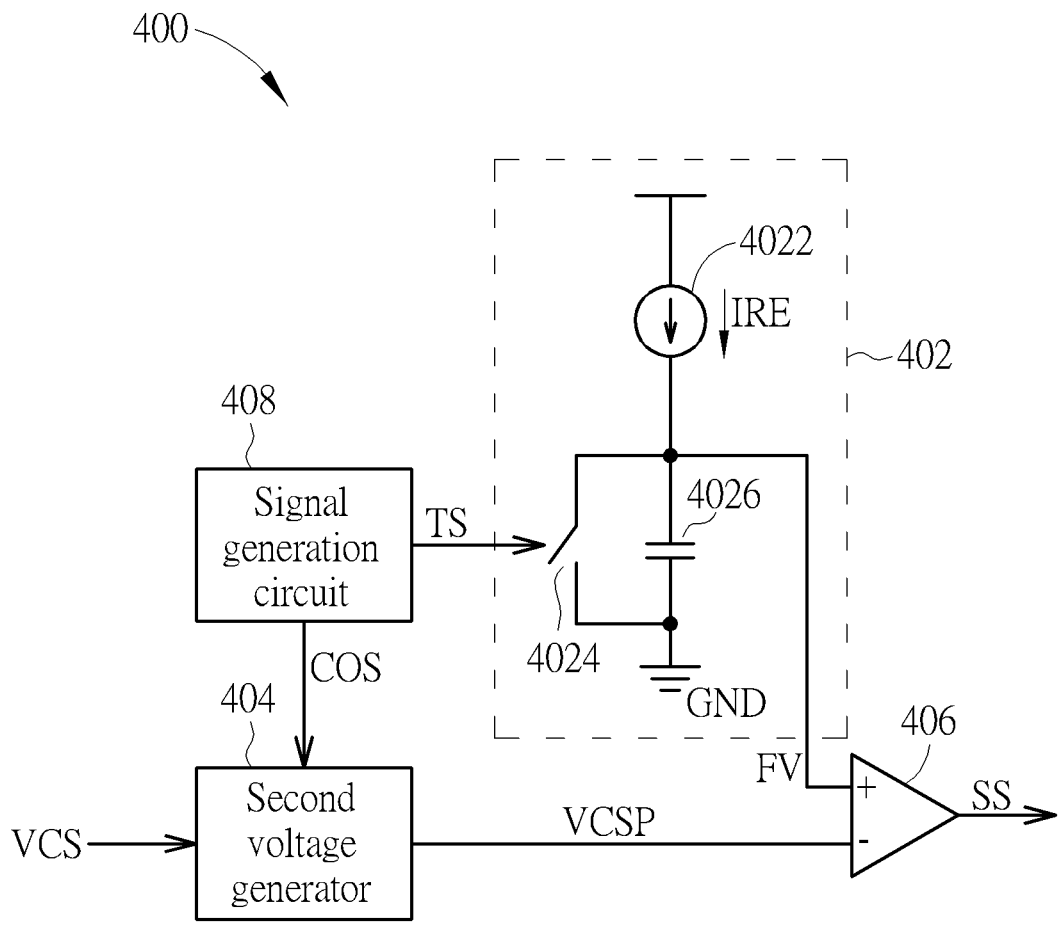
FIG. 4 is a diagram illustrating a sample-and-hold circuit for generating a variable sample signal of the power converter according to a second embodiment of the present invention.

Please refer to FIG. 4. FIG. 4 is a diagram illustrating a sample-and-hold circuit 400 for generating a variable sample signal of the power converter 100 according to a second embodiment of the present invention, wherein the sample-and-hold circuit 400 is used for replacing with the sample-and-hold circuit 108 of the control circuit 102 (shown in FIG. 1). In addition, as shown in FIG. 4, the sample-and-hold circuit 400 is further used for receiving the detection voltage VCS determined by the primary side current IP flowing through the power switch 106 and the resistor 109. As shown in FIG. 4, the sample-and-hold circuit 400 includes a first voltage generator 402, a second voltage generator 404, and a comparator 406. As shown in FIG. 4, the first voltage generator 402 includes a first current source 4022, a first switch 4024, and a first capacitor 4026. As shown in FIG. 4, the first current source 4022 is used for providing a reference current IRE; the first switch 4024 is coupled between the first current source 4022 and the ground GND for being turning-on and turning-off according to a turning-on signal TS; and the first capacitor 4026 is coupled between the first current source 4022 and the ground GND, wherein when the first switch 4024 is turned off according to the turning-on signal TS, the reference current IRE charges the first capacitor 4026 to generate the first voltage FV.

Figure 5:
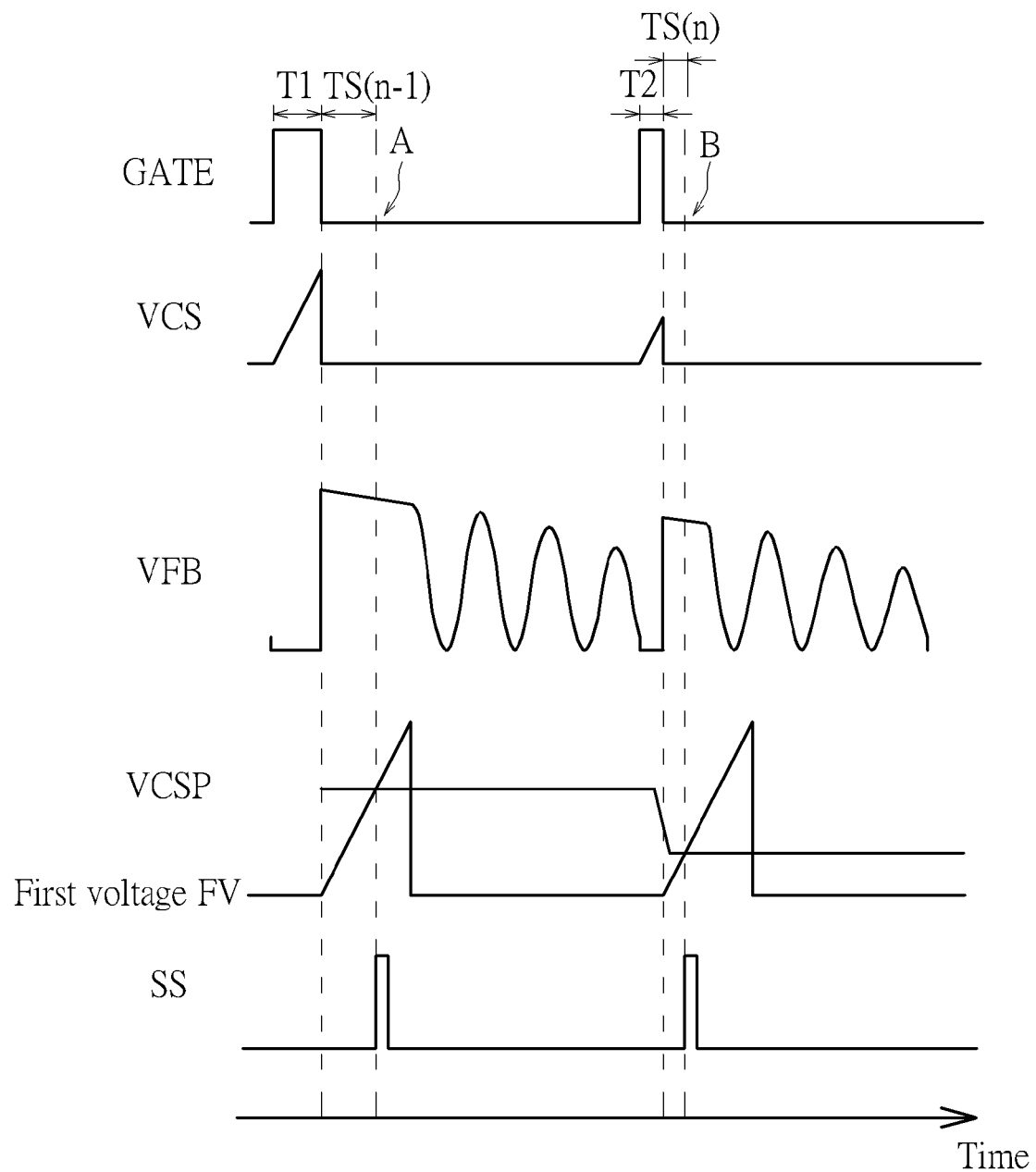
FIG. 5 is a timing diagram illustrating the gate control signal, the voltage corresponding to the auxiliary winding, the sample signal, the first voltage, the detection voltage, and the peak value of the detection voltage.

Please refer to FIG. 5. FIG. 5 is a timing diagram illustrating the gate control signal GATE, the voltage VFB corresponding to the auxiliary winding 104, the sample signal SS, the first voltage FV, the detection voltage VCS, and the peak value VCSP of the detection voltage VCS. As shown in FIG. 5, during a time T1, when the power switch 106 is turned on (that is, the gate control signal GATE is enabled), the second voltage generator 404 is used for generating the peak value VCSP of the detection voltage VCS according to a control signal COS and the detection voltage VCS determined by the primary side current IP flowing through the power switch 106 and the resistor 109. In addition, as shown in FIG. 5, after the time T1, the power switch 106 is turned off (that is, the gate control signal GATE is disabled). Meanwhile, the first switch 4024 is turned off according to the turning-on signal TS to make the reference current IRE start to charge the first capacitor 4026 to generate the first voltage FV, wherein as shown in FIG. 5, the first voltage FV is increased gradually. Therefore, when the first voltage FV is greater than the peak value VCSP of the detection voltage VCS (at a time point A shown in FIG. 5), the comparator 406 generates the sample signal SS to the comparator 107 of the control circuit 102 of the power converter 100. Similarly, as shown in FIG. 5, during a time T2, when the power switch 106 is turned on, the second voltage generator 404 generates the peak value VCSP of the detection voltage VCS (as shown in FIG. 5, because the time T2 is less than the time T1, the peak value VCSP of the detection voltage VCS corresponding to the time T2 is less than the peak value VCSP of the detection voltage VCS corresponding to the time T1). In addition, after the time T2, the power switch 106 is turned off. Meanwhile, the first switch 4024 is turned off according to the turning-on signal TS to make the reference current IRE start to charge the first capacitor 4026 to generate the first voltage FV, wherein as shown in FIG. 5, the first voltage FV is increased gradually. Therefore, when the first voltage FV is greater than the peak value VCSP of the detection voltage VCS (at a time point B shown in FIG. 5), the comparator 406 generates the sample signal SS to the comparator 107 of the control circuit 102 of the power converter 100.

As shown in FIG. 5, a time TS (n) and a TS (n−1) for the comparator 406 generating the sample signal SS are changed with the peak value VCSP of the detection voltage VCS (corresponding to an enabling time of the gate control signal GATE). Because the time TS(n) and the TS(n−1) for the comparator 406 generating the sample signal SS are changed with the peak value VCSP of the detection voltage VCS, the sample-and-hold circuit 400 can also overcome the disadvantage of the fixed sample time utilized by the prior art.

In addition, the sample-and-hold circuit 400 further includes a signal generation circuit 408 for generating the turning-on signal TS and the control signal COS.

Figure 6:
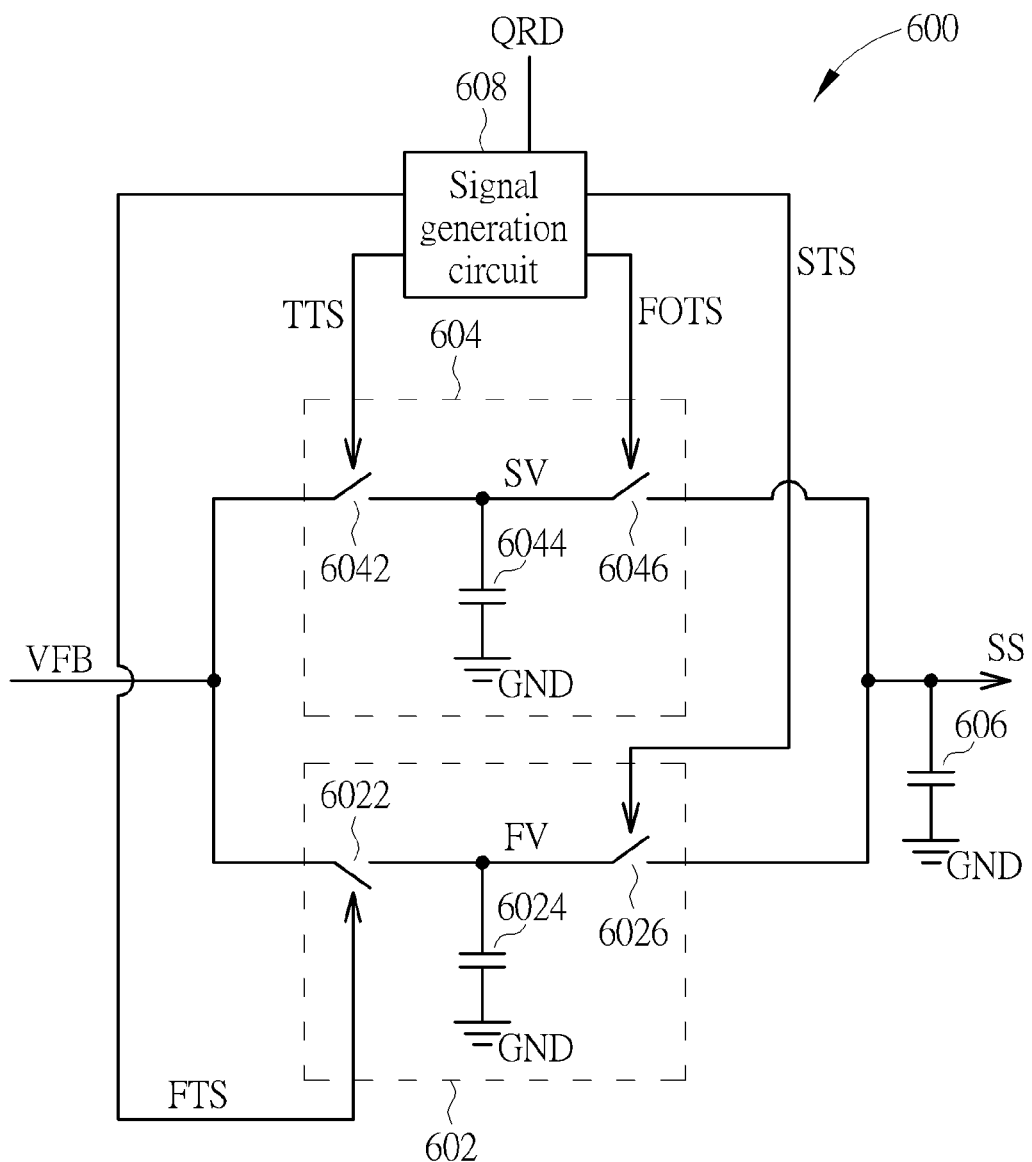
FIG. 6 is a diagram illustrating a sample-and-hold circuit for generating a variable sample signal of the power converter according to a third embodiment of the present invention.

Please refer to FIG. 6. FIG. 6 is a diagram illustrating a sample-and-hold circuit 600 for generating a variable sample signal of the power converter 100 according to a third embodiment of the present invention, wherein the sample-and-hold circuit 600 is used for replacing with the sample-and-hold circuit 108 of the control circuit 102 (shown in FIG. 1). As shown in FIG. 6, the sample-and-hold circuit 600 includes a first voltage generator 602, a second voltage generator 604, and a stabilization capacitor 606. The first voltage generator 602 is used for generating a first voltage FV according to a first predetermined delay time FPD and the voltage VFB corresponding to the auxiliary winding 104, wherein the first predetermined delay time FPD is a minimum sample time; the second voltage generator 604 is used for generating a second voltage SV according to K multiple of the discharge time TDIS(n−1) (that is, K*TDIS(n−1)) of the secondary side SEC of the power converter 100 corresponding to the previous period of the power converter 100 and the voltage VFB, wherein K<1, and K is changed with the load 110 coupled to the secondary side SEC of the power converter 100. That is to say, K is changed with the voltage of the pin (the COMP pin or the CS pin) of the control circuit 102, and the voltage of the pin (the COMP pin or the CS pin) of the control circuit 102 is changed with the load 110 coupled to the secondary side SEC of the power converter 100. In addition, when the load 110 coupled to the secondary side SEC of the power converter 100 is increased, K is also increased. But, the present invention is not limited to K being changed with the load 110 coupled to the secondary side SEC of the power converter 100. That is to say, in another embodiment of the present invention, K is a predetermined proportion.

As shown in FIG. 6, the first voltage generator 602 includes a first switch 6022, a first capacitor 6024, and a second switch 6026. The first switch 6022 is coupled to the auxiliary winding 104 for being turned on at the first predetermined delay time FPD according to a first turning-on signal FTS; the first capacitor 6024 is coupled between the first switch 6022 and the ground GND, wherein when the first switch 6022 is turned on according to the first turning-on signal FTS, the first capacitor 6024 generates the first voltage FV according to the voltage VFB; and the second switch 6026 is coupled between the first capacitor 6024 and the stabilization capacitor 606.

As shown in FIG. 6, the second voltage generator 604 includes a third switch 6042, a second capacitor 6044, and a fourth switch 6046. The third switch 6042 is coupled to the auxiliary winding 104 for being turned on at K multiple of the discharge time TDIS(n−1) of the secondary side SEC of the power converter 100 corresponding to the previous period of the power converter 100 according to a third turning-on signal TTS; the second capacitor 6044 is coupled between the third switch 6042 and the ground GND, wherein when the third switch 6042 is turned on according to the third turning-on signal TTS, the second capacitor 6044 generates the second voltage SV according to the voltage VFB; and the fourth switch 6046 is coupled between the second capacitor 6044 and the stabilization capacitor 606. In addition, a capacitance of the first capacitor 6024 is equal to a capacitance of the second capacitor 6044.

Figure 7:
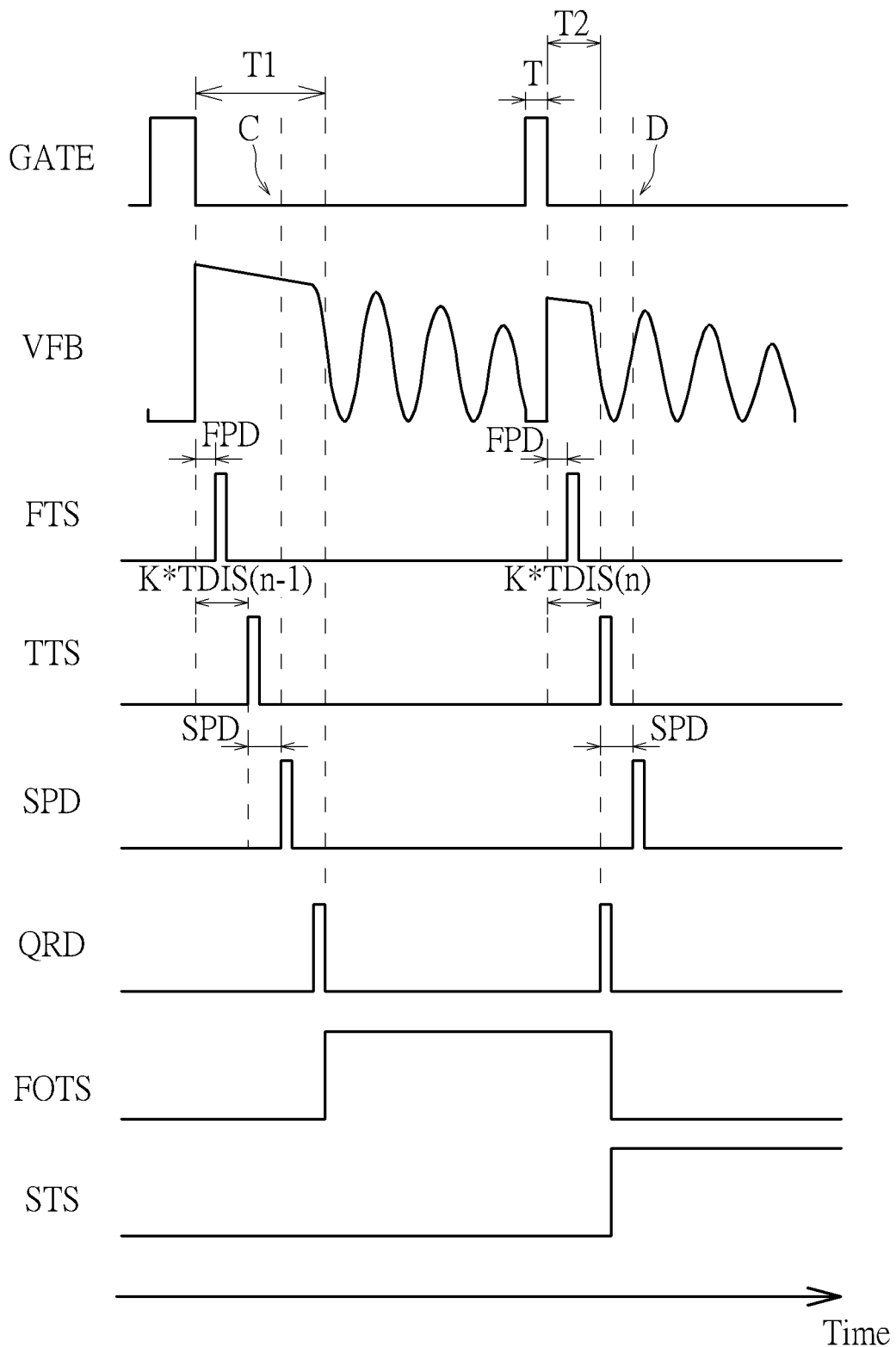
FIG. 7 is a timing diagram illustrating the gate control signal for controlling turning-on and turning-off of the power switch of the primary side of the power converter, the voltage, the first turning-on signal, the second turning-on signal, the third turning-on signal, the fourth turning-on signal, the first predetermined delay time, a second predetermined delay time, and a first valley corresponding to the voltage.

Please refer to FIG. 7. FIG. 7 is a timing diagram illustrating the gate control signal GATE for controlling turning-on and turning-off of the power switch 106 of the primary side PRI of the power converter 100, the voltage VFB, the first turning-on signal FTS, the second turning-on signal STS, the third turning-on signal TTS, the fourth turning-on signal FOTS, the first predetermined delay time FPD, a second predetermined delay time SPD, and a first valley QRD corresponding to the voltage VFB. As shown in FIG. 7, during a time T1, the first switch 6022 is turned on at the first predetermined delay time FPD according to the first turning-on signal FTS. Meanwhile, the first capacitor 6024 generates the first voltage FV according to the voltage VFB. As shown in FIG. 7, during the time T1, the third switch 6042 is turned on at K multiple of the discharge time TDIS(n−1) (that is, K*TDIS(n−1)) of the secondary side SEC of the power converter 100 corresponding to the previous period of the power converter 100 according to the third turning-on signal TTS. Meanwhile, the second capacitor 6044 generates the second voltage SV according to the voltage VFB. As shown in FIG. 7, because a sum (at a time point C shown in FIG. 7) of the K multiple of the discharge time TDIS(n−1) and the second predetermined delay time SPD leads the first valley QRD corresponding to the time T1, a signal generation circuit 608 generates the fourth turning-on signal FOTS accordingly, and the fourth switch 6046 is turned on according to the fourth turning-on signal FOTS, resulting in the second voltage generator 604 outputting the second voltage SV (that is, the sample signal SS) to the comparator 107 of the control circuit 102 of the power converter 100, wherein the stabilization capacitor 606 is used for stabilizing the second voltage SV, and the second predetermined delay time SPD is a fixed delay time. But, in another embodiment of the present invention, the second predetermined delay time SPD is changed with the load 110 coupled to the secondary side SEC of the power converter 100.

As shown in FIG. 7, during a time T2, the first switch 6022 is turned on at the first predetermined delay time FPD according to the first turning-on signal FTS. Meanwhile, the first capacitor 6024 generates the first voltage FV according to the voltage VFB. As shown in FIG. 7, during the time T2, the third switch 6042 is turned on at the K multiple of the discharge time TDIS(n) (that is, K*TDIS(n)) of the secondary side SEC of the power converter 100 corresponding to the previous period of the power converter 100 according to the third turning-on signal TTS. Meanwhile, the second capacitor 6044 generates the second voltage SV according to the voltage VFB. In addition, as shown in FIG. 7, because the turning-on time of the power switch 106 corresponding to a time T is shorter, the peak value VCSP of the detection voltage VCS corresponding to the time T is also smaller, and a discharge time of the secondary side SEC of the power converter 100 corresponding to the time T2 is also smaller, resulting in the sum (at a time point D shown in FIG. 7) of the K multiple of the discharge time TDIS(n) (that is, K*TDIS(n)) and the second predetermined delay time SPD lags the first valley QRD corresponding to the time T2. As shown in FIG. 7, because the sum (at the time point D shown in FIG. 7) of the K multiple of the discharge time TDIS(n) and the second predetermined delay time SPD lags the first valley QRD corresponding to the time T2, the signal generation circuit 608 generates the second turning-on signal STS accordingly, and the second switch 6026 is turned on according to the second turning-on signal STS, resulting in the first voltage generator 602 outputting the first voltage FV (that is, the sample signal SS) to the comparator 107 of the control circuit 102 of the power converter 100, wherein the stabilization capacitor 606 is used for stabilizing the first voltage FV.

As shown in FIG. 7, during the time T2, because the discharge time of the secondary side SEC of the power converter 100 corresponding to the time T2 becomes smaller, the second voltage generator 604 may generate incorrect a sampling result at the K multiple of the discharge time TDIS(n) of the secondary side SEC of the power converter 100 corresponding to the previous period of the power converter 100 (that is, the second voltage generator 604 does not generate the second voltage SV according to the voltage VFB before the first valley QRD of the voltage VFB corresponding to the time T2). However, because the first voltage generator 602 can still generate the first voltage FV at the first predetermined delay time FPD according to the voltage VFB, the sample-and-hold circuit 600 can still generate the correct sample signal SS (that is, the first voltage FV) to the comparator 107 of the control circuit 102 of the power converter 100. Therefore, the sample-and-hold circuit 600 can also overcome the disadvantage of the fixed sample time utilized by the prior art.

In addition, the present invention is not limited to potentials of the first turning-on signal FTS, the second turning-on signal STS, the third turning-on signal TTS, and the fourth turning-on signal FOTS shown in FIG. 7. That is to say, any that the sample-and-hold circuit 600 generates a correct sample signal changed with the load 110 and the turning-on time of the gate control signal GATE according to the first turning-on signal FTS, the second turning-on signal STS, the third turning-on signal TTS, and the fourth turning-on signal FOTS falls within the scope of the present invention. In addition, the sample-and-hold circuit 600 further includes the signal generation circuit 608, wherein the signal generation circuit 608 generates the first turning-on signal FTS, the second turning-on signal STS, the third turning-on signal TTS, and the fourth turning-on signal FOTS.

Figure 8:
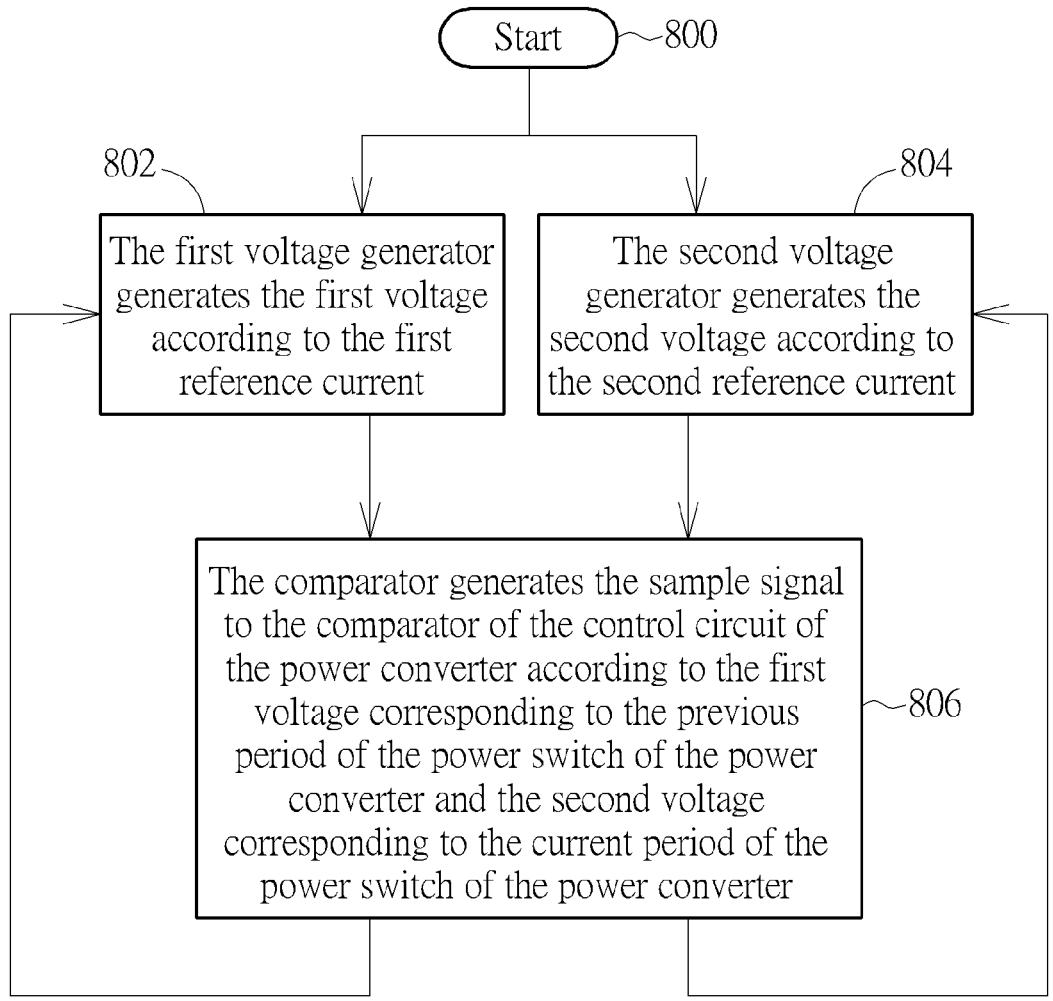
FIG. 8 is a flowchart illustrating a method for generating a variable sample signal of a power converter according to a fourth embodiment of the present invention.

Please refer to FIGS. 1-3, 8. FIG. 8 is a flowchart illustrating a method for generating a variable sample signal of a power converter according to a fourth embodiment of the present invention. The method in FIG. 8 is illustrated using the power converter 100 in FIG. 1 and the sample-and-hold circuit 200 in FIG. 2. Detailed steps are as follows:

Step 800: Start.

Step 802: The first voltage generator 202 generates the first voltage FV according to the first reference current IFR.

Step 804: The second voltage generator 204 generates the second voltage SV according to the second reference current ISR, wherein the second voltage SV corresponds to the turning-on time of the power switch 106 of the power converter 100 corresponding to the current period of the power converter 100.

Step 806: The comparator 206 generates the sample signal SS to the comparator 107 of the control circuit 102 of the power converter 100 according to the first voltage FV corresponding to the previous period of the power switch 106 of the power converter 100 and the second voltage SV corresponding to the current period of the power switch 106 of the power converter 100, go to Step 802 and Step 804.

In Step 802, as shown in FIG. 1 and FIG. 3, during the time T1, because the first turning-on signal FTS is enabled, the first switch 2024 of the first voltage generator 202 is turned on, resulting in the first reference current IFR charging the first capacitor 2026 to generate the first voltage FV corresponding to the time T1, wherein during the time T1, the enabling time of the first turning-on signal FTS is equal to the discharge time TDIS(n−1) of the power converter 100 corresponding to the time T1. In Step 804, as shown in FIG. 1 and FIG. 3, during the time T1, because the first turning-on signal FTS is enabled, the fourth switch 2044 of the second voltage generator 204 is turned on, resulting in the second reference current ISR charging the third capacitor 2046 to generate the second voltage SV corresponding to the time T1, wherein the second reference current ISR is equal to the K multiple of the difference between the first reference current IFR and the peak current, K>1, and the peak current corresponds to the peak value VCSP of the detection voltage VCS. In addition, K is changed with the load 110 coupled to the secondary side SEC of the power converter 100. That is to say, K is changed with the voltage of the pin (the COMP pin or the CS pin) of the control circuit 102, wherein the voltage of the pin (the COMP pin or the CS pin) is changed with the load 110 coupled to the secondary side SEC of the power converter 100. In addition, when the load 110 coupled to the secondary side SEC of the power converter 100 is increased, K is also increased. But, the present invention is not limited to K being changed with the load 110 coupled to the secondary side SEC of the power converter 100. That is to say, in another embodiment of the present invention, K can be a predetermined proportion.

As shown in FIG. 3, during the time T2, the third turning-on signal TTS is enabled between the negative edge of the first turning-on signal FTS and the positive edge of the turning-on time of the power switch 106 of the primary side PRI of the power converter 100. Therefore, the second capacitor 2032 stores the first voltage FV corresponding to the time T1 (that is, the first voltage FV corresponding to the previous period of the power switch 106 of the power converter 100) during turning-on of the third switch 2030 according to the third turning-on signal TTS. In addition, as shown in FIG. 3, during the time T2, after the third turning-on signal TTS is disabled, the second switch 2028 of the first voltage generator 202 is turned on according to the second turning-on signal STS to erase residual charges stored in the first capacitor 2026, and the fifth switch 2048 of the second voltage generator 204 is also turned on according to the second turning-on signal STS to erase residual charges stored in the third capacitor 2046. That is to say, when the time T2 is finished, potentials of the first capacitor 2026 and the third capacitor 2046 are equal to potential of the ground GND.

In Step 806, as shown in FIG. 3, during the time T3, because the first turning-on signal FTS is enabled again, the first switch 2024 and the fourth switch 2044 are turned on, and the first reference current IFR charges the first capacitor 2026 again to generate the first voltage FV corresponding to the time T3 (that is, the first voltage FV corresponding to the current period of the power switch 106 of the power converter 100) and the second reference current ISR charges the third capacitor 2046 again to generate the second voltage SV corresponding to the time T3 (that is, the second voltage SV corresponding to the current period of the power switch 106 of the power converter 100). During the time T3, the voltage stored in the second capacitor 2032 is equal to the first voltage FV corresponding to the time T1 (the first voltage FV corresponding to the previous period of the power switch 106 of the power converter 100), that is, the voltage inputted in the negative input terminal of the comparator 206 is equal to the first voltage FV corresponding to the time T1. Therefore, when the second voltage SV corresponding to the time T3 (the voltage inputted in the positive input terminal of the comparator 206) is greater than the first voltage FV corresponding to the time T1 (that is, at the time TS(n)), the comparator 206 generates the sample signal SS.

Therefore, as shown in FIG. 3, because the turning-on time of the power switch 106 corresponding to the time T is shorter, the peak value VCSP of the detection voltage VCS corresponding to the time T is also smaller, resulting in the second reference current ISR being increased. Therefore, as shown in equation (2) and FIG. 3, during the time T3, because the second reference current ISR is increased, the time TS(n) for the comparator 206 generating the sample signal SS is decreased. That is to say, during the time T3, the time TS(n) for the comparator 206 generating the sample signal SS is not only changed with the discharge time TDIS(n−1) corresponding to the time T1 (wherein the discharge time TDIS(n−1) corresponding to the time T1 is changed with the load 110), but also changed with the peak value VCSP of the detection voltage VCS corresponding to the time T. Because the time TS (n) for the comparator 206 generating the sample signal SS is not only changed with the load 110 corresponding to the time T1, but also changed with the peak value VCSP of the detection voltage VCS corresponding to the time T, the sample-and-hold circuit 200 can overcome the disadvantage of the fixed sample time utilized by the prior art.

Figure 9:
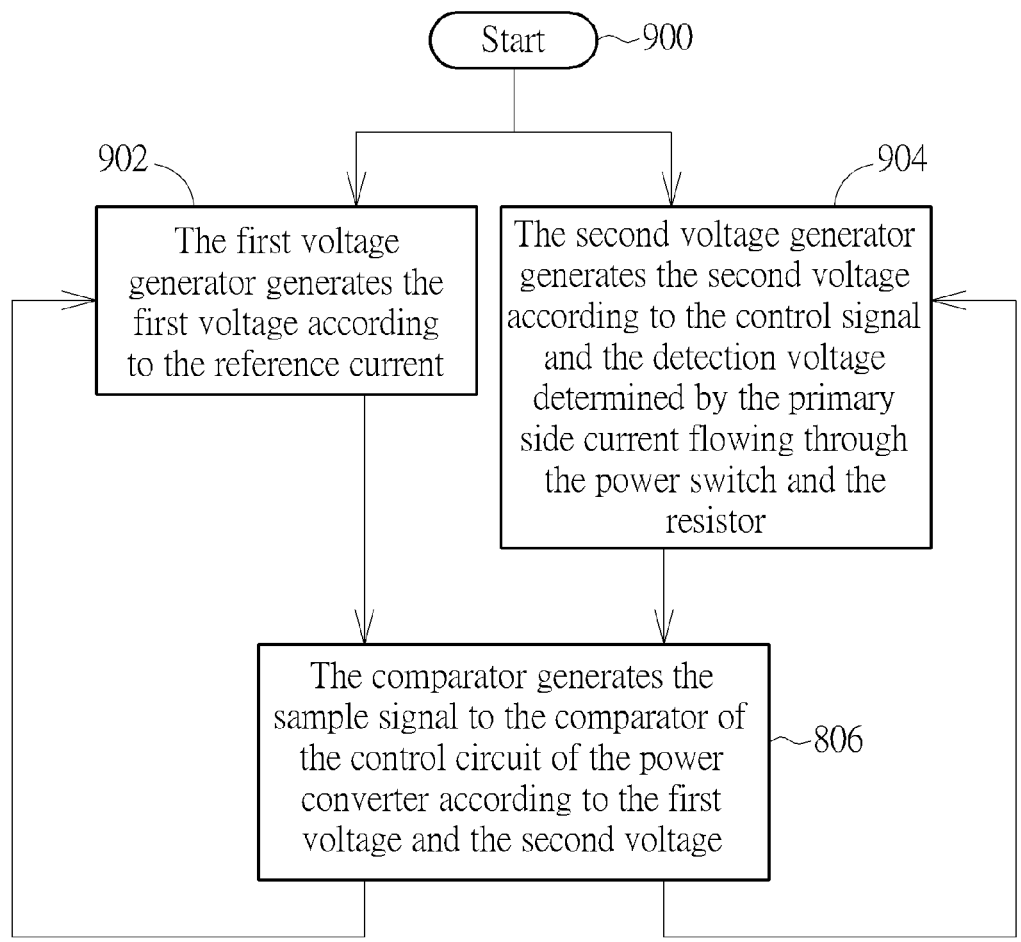
FIG. 9 is a flowchart illustrating a method for generating a variable sample signal of a power converter according to a fifth embodiment of the present invention.

Please refer to FIGS. 1, 4, 5, 9. FIG. 9 is a flowchart illustrating a method for generating a variable sample signal of a power converter according to a fifth embodiment of the present invention. The method FIG. 9 is illustrated using the power converter 100 in FIG. 1 and the sample-and-hold circuit 400 in FIG. 4. Detailed steps are as follows:

Step 900: Start.

Step 902: The first voltage generator 402 generates the first voltage FV according to the reference current IRE.

Step 904: The second voltage generator 404 generates the second voltage SV according to the control signal COS and the detection voltage VCS determined by the primary side current IP flowing through the power switch 106 and the resistor 109, wherein the second voltage SV is the peak value VCSP of the detection voltage VCS.

Step 906: The comparator 206 generates the sample signal SS to the comparator 107 of the control circuit 102 of the power converter 100 according to the first voltage FV and the second voltage SV, go to Step 902 and Step 904.

In Step 902, as shown in FIG. 5, after the time T1, the power switch 106 is turned off (that is, the gate control signal GATE is disabled). Meanwhile, the first switch 4024 is turned off according to the turning-on signal TS to make the reference current IRE start to charge the first capacitor 4026 to generate the first voltage FV, wherein as shown in FIG. 5, the first voltage FV is increased gradually. In Step 904, as shown in FIG. 5, during the time T1, when the power switch 106 is turned on (that is, the gate control signal GATE is enabled), the second voltage generator 204 is used for generating the peak value VCSP (that is, the second voltage SV) of the detection voltage VCS according to the control signal COS and the detection voltage VCS determined by the primary side current IP flowing through the power switch 106 and the resistor 109. Therefore, in Step 906, when the first voltage FV is greater than the peak value VCSP of the detection voltage VCS (at the time point A shown in FIG. 5), the comparator 406 generates the sample signal SS to the comparator 107 of the control circuit 102 of the power converter 100. Similarly, as shown in FIG. 5, during the time T2, when the power switch 106 is turned on, the second voltage generator 404 generates the peak value VCSP of the detection voltage VCS (as shown in FIG. 5, because the time T2 is less than the time T1, the peak value VCSP of the detection voltage VCS corresponding to the time T2 is less than the peak value VCSP of the detection voltage VCS corresponding to the time T1). In addition, after the time T2, the power switch 106 is turned off. Meanwhile, the first switch 4024 is turned off according to the turning-on signal TS to make the reference current IRE start to charge the first capacitor 4026 to generate the first voltage FV. Therefore, when the first voltage FV is greater than the peak value VCSP of the detection voltage VCS (at the time point B shown in FIG. 5), the comparator 406 generates the sample signal SS to the comparator 107 of the control circuit 102 of the power converter 100.

As shown in FIG. 5, the time TS(n) and the TS(n−1) for the comparator 406 generating the sample signal SS are changed with the peak value VCSP (corresponding to the enabling time of the gate control signal GATE) of the detection voltage VCS. Because the time TS(n) and the TS(n−1) for the comparator 406 generating the sample signal SS are changed with the peak value VCSP of the detection voltage VCS, the sample-and-hold circuit 400 can also overcome the disadvantage of the fixed sample time utilized by the prior art.

Figure 10:
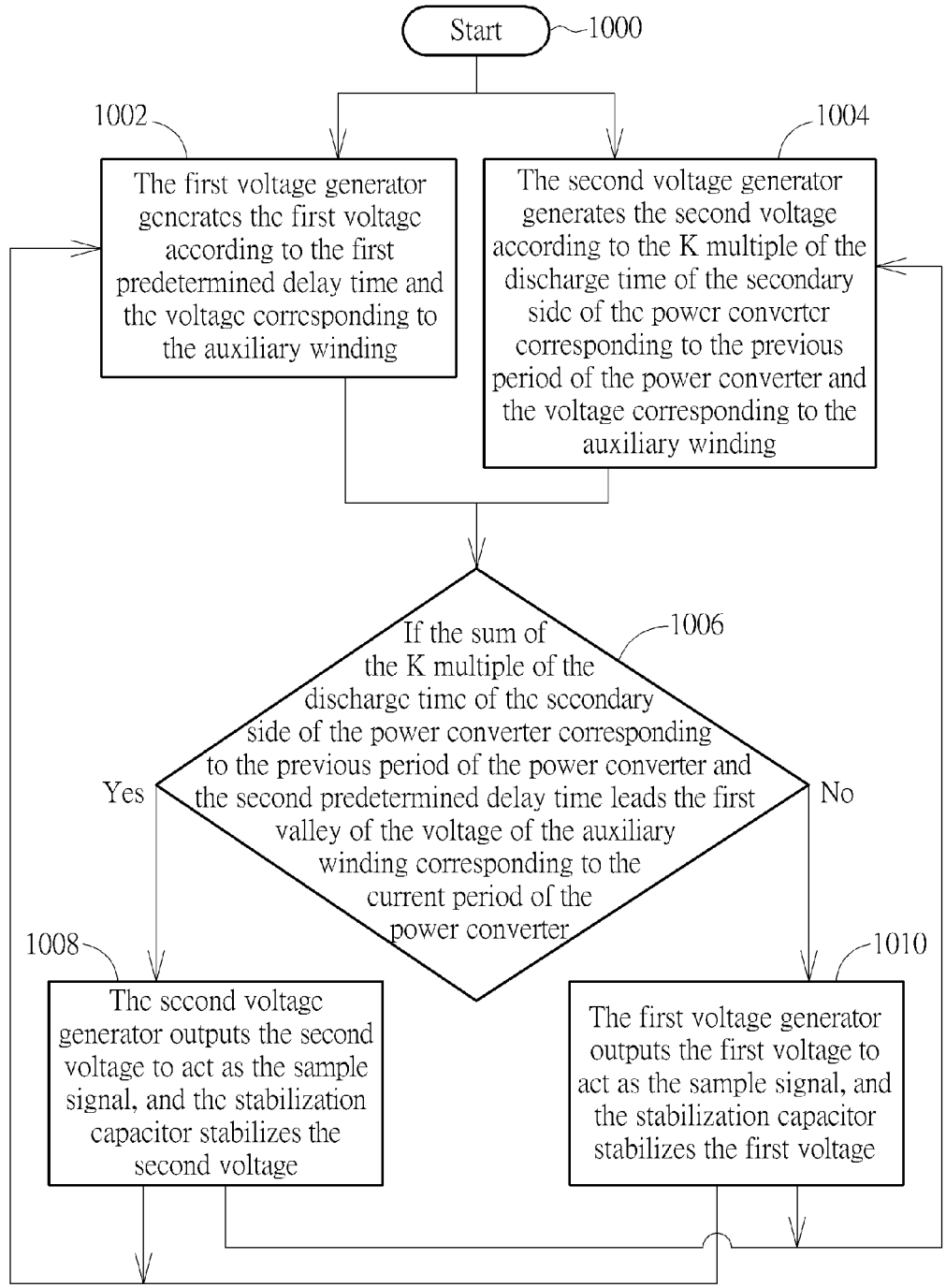
FIG. 10 is a flowchart illustrating a method for generating a variable sample signal of a power converter according to a sixth embodiment of the present invention.

Please refer to FIGS. 1, 6, 7, 10. FIG. 10 is a flowchart illustrating a method for generating a variable sample signal of a power converter according to a sixth embodiment of the present invention. The method in FIG. 10 is illustrated using the power converter 100 in FIG. 1 and the sample-and-hold circuit 600 in FIG. 6. Detailed steps are as follows:

Step 1000: Start.

Step 1002: The first voltage generator 602 generates the first voltage FV according to the first predetermined delay time FPD and the voltage VFB corresponding to the auxiliary winding 104.

Step 1004: The second voltage generator 604 generates the second voltage SV according to the K multiple of the discharge time TDIS(n−1) of the secondary side SEC of the power converter 100 corresponding to the previous period of the power converter 100 and the voltage VFB corresponding to the auxiliary winding 104.

Step 1006: If the sum of the K multiple of the discharge time TDIS(n−1) of the secondary side SEC of the power converter 100 corresponding to the previous period of the power converter 100 and the second predetermined delay time SPD leads the first valley QRD of the voltage VFB of the auxiliary winding 104 corresponding to the current period of the power converter 100; if yes, go to Step 1008; if no, go to Step 1010.

Step 1008: The second voltage generator 604 outputs the second voltage SV to act as the sample signal SS, and the stabilization capacitor 606 stabilizes the second voltage SV, go to Step 1002 and Step 1004.

Step 1010: The first voltage generator 602 outputs the first voltage FV to act as the sample signal SS, and the stabilization capacitor 606 stabilizes the first voltage FV, go to Step 1002 and Step 1004.

In Step 1002, as shown in FIG. 7, during the time T1, the first switch 6022 is turned on at the first predetermined delay time FPD according to the first turning-on signal FTS. Meanwhile, the first capacitor 6024 generates the first voltage FV according to the voltage VFB, wherein the first predetermined delay time FPD is a minimum sample time. In Step 1004, as shown in FIG. 7, during the time T1, the third switch 6042 is turned on at the K multiple of the discharge time TDIS(n−1) (that is, K*TDIS(n−1)) of the secondary side SEC of the power converter 100 corresponding to the previous period of the power converter 100 according to the third turning-on signal TTS. Meanwhile, the second capacitor 6044 generates the second voltage SV according to the voltage VFB, wherein K<1, and K is changed with the load 110 coupled to the secondary side SEC of the power converter 100. That is to say, K is changed with the voltage of the pin (the COMP pin or the CS pin) of the control circuit 102, and the voltage of the pin (the COMP pin or the CS pin) of the control circuit 102 is changed with the load 110 coupled to the secondary side SEC of the power converter 100. In addition, when the load 110 coupled to the secondary side SEC of the power converter 100 is increased, K is also increased. But, the present invention is not limited to K being changed with the load 110 coupled to the secondary side SEC of the power converter 100. That is to say, in another embodiment of the present invention, K can be a predetermined proportion.

In Step 1008, as shown in FIG. 7, because the sum (at the time point C shown in FIG. 7) of the K multiple of the discharge time TDIS(n−1) of the secondary side SEC of the power converter 100 corresponding to the previous period of the power converter 100 and the second predetermined delay time SPD leads the first valley QRD corresponding to the time T1, the signal generation circuit 608 generates the fourth turning-on signal FOTS accordingly, and the fourth switch 6046 is turned on according to the fourth turning-on signal FOTS, resulting in the second voltage generator 604 outputting the second voltage SV (that is, the sample signal SS) to the comparator 107 of the control circuit 102 of the power converter 100, wherein the stabilization capacitor 606 is used for stabilizing the second voltage SV, and the second predetermined delay time SPD is a fixed delay time. But, in another embodiment of the present invention, the second predetermined delay time SPD is changed with the load 110 coupled to the secondary side SEC of the power converter 100.

In Step 1010, as shown in FIG. 7, during the time T2, because the turning-on time of the power switch 106 corresponding to the time T is shorter, the peak value VCSP of the detection voltage VCS corresponding to the time T is also smaller, resulting in the voltage VFB corresponding to the time T2 being also decreased. Because the voltage VFB corresponding to the time T2 is decreased, the discharge time of the secondary side SEC of the power converter 100 corresponding to the time T2 is also smaller, resulting in the sum (at the time point D shown in FIG. 7) of the K multiple of the discharge time TDIS(n) of the secondary side SEC of the power converter 100 corresponding to the previous period of the power converter 100 and the second predetermined delay time SPD lagging the first valley QRD corresponding to the time T2. As shown in FIG. 7, because the sum of the K multiple of the discharge time TDIS(n) of the secondary side SEC of the power converter 100 corresponding to the previous period of the power converter 100 and the second predetermined delay time SPD lags the first valley QRD corresponding to the time T2, the signal generation circuit 608 generates the second turning-on signal STS accordingly, and the second switch 6026 is turned on according to the second turning-on signal STS, resulting in the first voltage generator 602 outputting the first voltage FV (that is, the sample signal SS) to the comparator 107 of the control circuit 102 of the power converter 100, wherein stabilization capacitor 606 is used for stabilizing the first voltage FV.

As shown in FIG. 7, during the time T2, because the discharge time of the secondary side SEC of the power converter 100 corresponding to the time T2 becomes smaller, the second voltage generator 604 may generate incorrect a sampling result at the K multiple of the discharge time TDIS(n) of the secondary side SEC of the power converter 100 corresponding to the previous period of the power converter 100 (that is, the second voltage generator 604 does not generate the second voltage SV according to the voltage VFB before the first valley QRD of the voltage VFB corresponding to the time T2). However, because the first voltage generator 602 can still generate the first voltage FV at the first predetermined delay time FPD according to the voltage VFB, generates the first voltage FV, the sample-and-hold circuit 600 can still generate the correct sample signal SS (that is, the first voltage FV) to the comparator 107 of the control circuit 102 of the power converter 100. Therefore, the sample-and-hold circuit 600 can also overcome the disadvantage of the fixed sample time utilized by the prior art.

To sum up, the sample-and-hold circuit for generating the variable sample signal of the power converter and the method thereof utilize the peak value of the detection voltage determined by the primary side current flowing through the power switch and the resistor, or utilize different sample time to sample the discharge time of the secondary side of the power converter two times to generate a corresponding sample signal to the comparator of the control circuit of the power converter. Because the peak value of the detection voltage and the different sample time are changed with the load coupled to the secondary side of the power converter, a time for the sample-and-hold circuit generating the corresponding sample signal is also changed with the load coupled to the secondary side of the power converter. Therefore, compared to the prior art, the present invention can overcome the disadvantage of the fixed sample time utilized by the prior art.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A sample-and-hold circuit for generating a variable sample signal of a power converter, comprising:
   a first voltage generator for generating a first voltage according to a first reference current;
   a second voltage generator for generating a second voltage, wherein the second voltage corresponds to a turning-on time of a power switch of the power converter, and the second voltage generator comprises:
      a first current source for providing a first reference current, wherein the first reference current is equal to K multiple of a difference between the first reference current and a peak current, wherein K>1, and the peak current corresponds to a peak value of a detection voltage determined by a primary side current flowing through the power switch of the power converter and a resistor;
      a first switch coupled to the first current source for being turning-on and turning-off according to a first turning-on signal;
      a first capacitor coupled between the first switch and ground, wherein when the first switch is turned on according to the first turning-on signal, the first reference current charges the first capacitor to generate the second voltage, wherein a capacitance of the first capacitor is equal to a capacitance of a second capacitor comprised in the first voltage generator; and
      a second switch coupled to the first switch, a comparator, and the ground for being turning-on and turning-off according to a second turning-on signal, wherein after the first turning-on signal and a third turning-on signal are disabled, the second switch is turned on according to the second turning-on signal to erase residual charges stored in the first capacitor; and
   the comparator for generating a sample signal to a control circuit within the power converter according to the first voltage and the second voltage.

2. The sample-and-hold circuit of claim 1, wherein the first voltage generator comprising:
   a second current source for providing the second reference current;
   a third switch coupled between the second current source and ground for being turning-on and turning-off according to a turning-on signal; and
   a second capacitor coupled between the second current source and the ground, wherein when the third switch is turned off, the second reference current charges the second capacitor to generate the first voltage.

3. The sample-and-hold circuit of claim 1, wherein the second voltage generator generates the second voltage according to a control signal and the detection voltage when the power switch is turned on, wherein the second voltage is the peak value of the detection voltage.

4. The sample-and-hold circuit of claim 1, wherein the first voltage generator comprising:
   a second current source for providing the second reference current;
   a third switch coupled to the second current source for being turning-on and turning-off according to the first turning-on signal;
   a second capacitor coupled between the third switch and ground, wherein when the third switch is turned on according to the first turning-on signal, the second reference current charges the second capacitor to generate the first voltage;
   a second fourth switch coupled between the third switch and the ground for being turning-on and turning-off according to the second turning-on signal;
   a fifth switch coupled to the third switch, the second capacitor, and the fourth switch for being turning-on and turning-off according to a third turning-on signal; and
   a third capacitor coupled to the fifth switch, the comparator, and the ground for stabilizing the first voltage during turning-on of the fifth switch according to the third turning-on signal;
   wherein after the third switch is turned off according to the first turning-on signal and before a positive edge of the turning-on time of the power switch of the power converter, the fifth switch is turned on according to the third turning-on signal, a capacitance of the second capacitor is equal to a capacitance of the third capacitor, and after the first turning-on signal and the third turning-on signal are disabled, the fourth switch is turned on according to the second turning-on signal to erase residual charges stored in the second capacitor.

5. The sample-and-hold circuit of claim 1, wherein K is a predetermined proportion.

6. The sample-and-hold circuit of claim 1, wherein K is changed with a voltage of a pin of the control circuit, and the voltage of the pin is changed with a load coupled to a secondary side of the power converter.

7. A method for generating a variable sample signal of a power converter, wherein a sample-and-hold circuit applied to the method comprises a first voltage generator, a second voltage generator, and a comparator, the method comprising:

the first voltage generator generating a first voltage according to a first reference current;

the second voltage generator generating a second voltage according to a second reference current, wherein the second reference current is equal to K multiple of a difference between the first reference current and a peak current, wherein K>1, the peak current corresponds to a peak value of a detection voltage determined by a primary side current flowing through a power switch of the power converter and a resistor, and, the second voltage corresponds to a turning-on time of the power switch of the power converter; and the comparator generating a sample signal to a control circuit within the power converter according to the first voltage and the second voltage.

8. The method of claim 7, wherein the second voltage generator generates the second voltage according to a control signal and the detection voltage when the power switch is turned on, wherein the second voltage is the peak value of the detection voltage.

9. The method of claim 7, wherein K is a predetermined proportion.

10. The method of claim 7, wherein K is changed with a voltage of a pin of the control circuit, and the voltage of the pin is changed with a load coupled to a secondary side of the power converter.

* * * * *